United States Patent [19]

Kochert et al.

[11] Patent Number: 4,995,092
[45] Date of Patent: Feb. 19, 1991

[54] CIRCUIT ARRANGEMENT FOR WHITE LEVEL ACQUISITION FOR THE BLACK/WHITE QUANTIZATION OF THE SCAN SIGNALS OF INDIVIDUAL PHOTO SENSORS

[75] Inventors: Wilfried Kochert, Konstanz; Dietmar Dowe, Stockach-Wahlwies; Hans-Joachim Schwarz; Eberhard Ullrich, both of Konstanz, all of Fed. Rep. of Germany

[73] Assignee: Computergesellschaft Konstanz, Fed. Rep. of Germany

[21] Appl. No.: 411,744

[22] Filed: Sep. 25, 1989

[30] Foreign Application Priority Data

Sep. 30, 1988 [EP] European Pat. Off. ........ 88116236.6

[51] Int. Cl.⁵ .............................................. G06K 9/00
[52] U.S. Cl. ........................................ 382/53; 382/52; 358/466
[58] Field of Search ....................... 382/50, 52, 53, 54; 358/455, 465, 466

[56] References Cited

U.S. PATENT DOCUMENTS

| 4,468,704 | 8/1984 | Stoffel et al. ........................ 382/52 |
| 4,562,486 | 12/1985 | Suzuki et al. ...................... 358/466 |
| 4,667,237 | 5/1987 | Yakomizo .......................... 358/160 |
| 4,710,822 | 12/1987 | Matsunawa ........................ 358/466 |
| 4,853,792 | 8/1989 | Katsuta et al. ...................... 382/52 |

FOREIGN PATENT DOCUMENTS 0052187 5/1982 European Pat. Off. .
2020942 11/1979 United Kingdom .

OTHER PUBLICATIONS

Reese, R. J.; "Black and White Level Follower Device for an OCR System", IBM Technical Disclosure Bulletin, vol. 22, No. 6, Nov., 1979, pp. 2248–2249.

Primary Examiner—David K. Moore
Assistant Examiner—Yon Jung
Attorney, Agent, or Firm—Hill, Van Santen, Steadman & Simpson

[57] ABSTRACT

A circuit arrangement is composed of a first adder whose first output is assigned to the digitized output signals of the photosensors and a second input connected to the outputs of a white level memory, and a second adder at whose input side the currently stored white level are linked with the correction signal and which reads the resultant signal back into the white level memory, the comparator following the first adder which, dependent upon the threshold level derived from maximum and average blackening values of the output signal of the first adder supplies a black signal or a white signal. A correction signal derived from a plurality of influencing variables serves for white level correction, the correction signal supplying a white level increment/decrement for delivery into the white level memory dependent on a carry signal that appears or, respectively, that does not appear at the first adder.

9 Claims, 1 Drawing Sheet

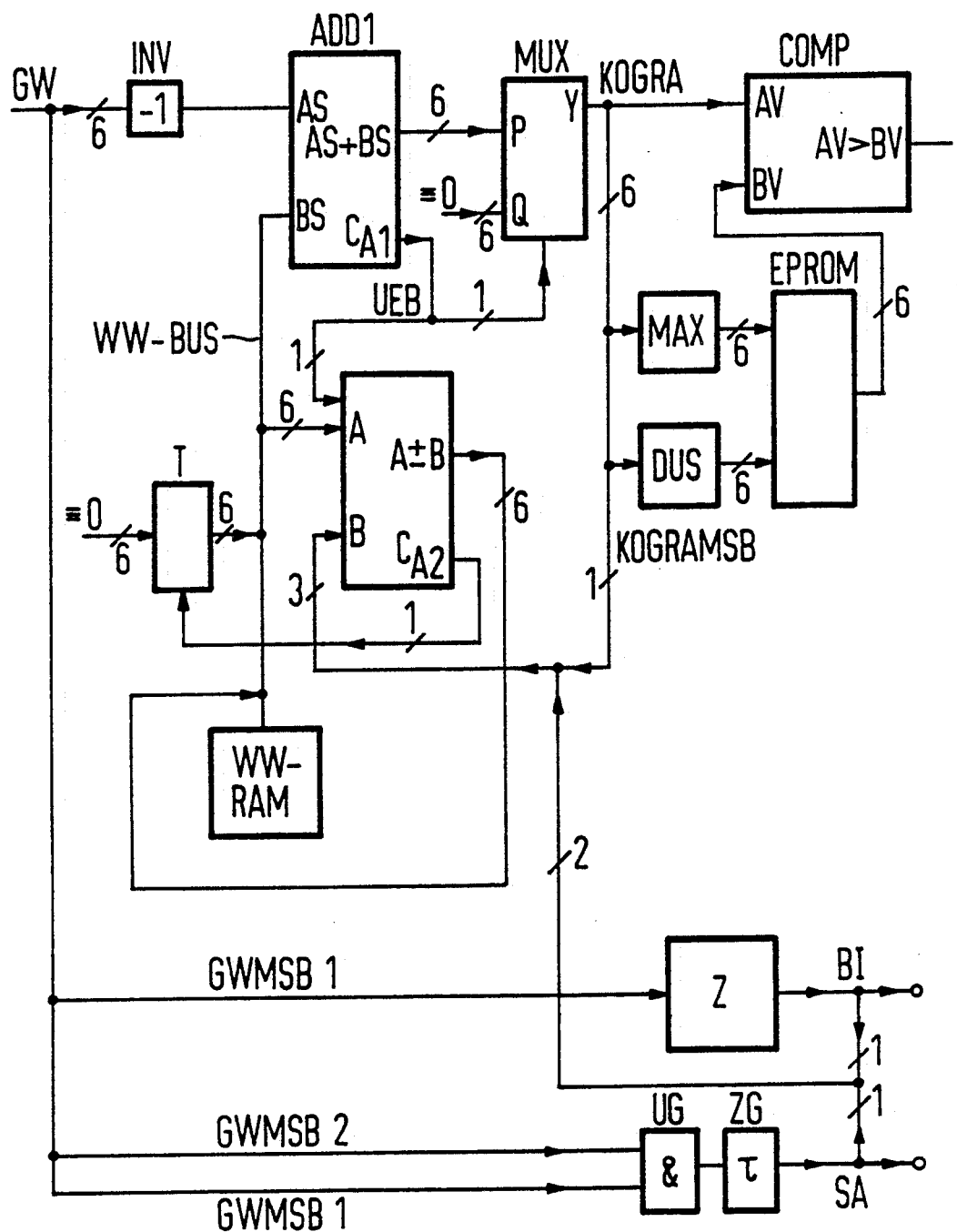

CIRCUIT ARRANGEMENT FOR WHITE LEVEL ACQUISITION FOR THE BLACK/WHITE QUANTIZATION OF THE SCAN SIGNALS OF INDIVIDUAL PHOTO SENSORS

BACKGROUND OF THE INVENTION

1. Field of the Invention

The present invention is directed to a circuit arrangement for white level acquisition for the black/white quantization of scan signals of individual photo sensors having different gray levels in which an adder is assigned to the digitized output signals of the photosensor which has a second input connected to the outputs of the white level memory, a second adder whose input links the currently stored white levels with a correction and reads the results signal back into the white level memory and a comparator following the first adder for supplying a black signal or white signal dependent on a threshold derived from maximum blackening values and averaged blackening values of the output signal of the first adder.

2. Description of the Prior Art

There is a problem in optical character recognition that, on the one hand, the recognition unit requires what is referred to as a pixel image wherein every pixel has a black or white level assigned thereto, but that the optical scanner, on the other hand, supplies only an analog video image composed of different gray levels. Great care is therefore to be exercised in the black/white quantization on the basis of an optimally-precise gray level reproduction. Accurate gray level reproduction, however, encounters the following difficulties:

The optical scanner generates a pixel image that is formed of the scan signals of a plurality of photodiodes. In the ideal case, the photodiodes should have the same transfer characteristics, so that the output signal at all pixel diodes would be strictly proportional to the incident light power. The fact is, however, that the signal for at least a part of the diodes is not zero given darkness and that the proportionality factors or, respectively, the sensitivities differ from pixel diode-to-pixel diode.

Actually it is not the light powers incident on the pixel diodes per se that are relevant for the gray levels; rather, it is the reflection factors of the sub-areas of the paper belonging to the pixel. These, however, are falsified in the pixel diode light power, namely, due to non-uniform illumination of the paper and due to non-uniform brightness transmission of the objective lens (for example, "vignetting"). In the ideal case, the raw data of the pixel gray levels must be corrected such that they are proportional to the paper pixel reflection factors of entirely black through entirely white.

The clamp circuit for chronologically variable, digitized input signals disclosed in the German patent 28 13 352 is referenced in this context, whereby the output signals are referred both to a variable reference value derived from an extreme value of the input signals as well as to the output signals themselves. For example, such a clamp circuit is employed in optical character recognition, whereby the evaluation of a scan signal as a white level or, respectively, black level, is only possible with a variable reference value because of various influences, including that of the changing contrast between character and character background. The variation of this reference value is achieved by a constant decrease or by a reacceptance of the reference value per clock step. A white level is thereby stored for every pixel diode, this white level being modified in the following fashion given the serial arrival of a new pixel gray level. When the gray level is whiter than the stored white level, then the gray level is written into the memory as a new gray level. When, by contrast, the gray level is darker than the stored white level, the latter is modified or, respectively, "aged" in the direction towards back by a slight decrement.

On the basis of immediate registration of whiter levels and only slow decrementation in a direction towards black, the function of a maximum value memory derives that contains the whitest level of the recent past for every pixel diode. This method especially has two disadvantages.

A new white level is also registered even if it occurred only briefly. A small, shiny white point on the paper can thereby shift the white level such that the gray level following this pixel diode are referred to an excessively high white level for some time, i.e. are reproduced excessively dark. Blackenings can be drawn "behind" shiny points as artifacts.

When a pixel diode having retarded scan rate is moved over a dark character element, the white level decrementation has adequate time to greatly diminish the white level. Given a slowly scanned or, respectively, stationary character, the impression then arises as though this character were fading.

SUMMARY OF THE INVENTION

It is therefore the object of the present invention to provide an improved circuit arrangement for the white level acquisition for the black/white quantization of the scan signals of individual photosensors having different gray levels, comprising first and second adders, white level memory and a comparator in which the first adder has an first input assigned to the digitized output signals of the photosensors and a second input connected to the output of the white level memory, the second adder has an input side which links the currently-stored white levels with a correction signal and which reads the resultant signal back into the white level memory, and the comparator follows the first adder and supplies a black signal or a white signal dependent on a threshold derived from maximum blackening values and averaged blackening values of the output signal of the first adder such that an excessively abrupt white level correction is avoided even taking a plurality of disturbing quantities into consideration and such that a gentler control behavior overall is provided.

The object is achieved, according to the invention, when the circuit arrangement is characterized by a variable correction signal which is derived from a plurality of influencing variables that, dependent on a carry signal appearing at the first adder or, respectively, not appearing thereat, supplies a white level increment sized decrement for delivery into the white level memory. According to the invention, therefore, the stored white levels are no longer immediately overwritten when a "whiter" gray level appears. In this case, the white level is only incremented, to wit, by a value (increment) that can differ in size dependent on the respective conditions. Given a darker gray level, likewise "aging" is not carried out at a constant rate; rather, the white value is decremented, namely by a value (decrement) that can also be of different sizes here dependent on the respective conditions. What is thereby advantageous is that, first of all, the white level finding is topically smoothed, i.e. that the white level is no longer so noticeably corrected even given extremely small, particularly bright paper details, and that, on the other hand, the amount of increment and decrement can be respectively beneficially matched to the respective current conditions.

BRIEF DESCRIPTION OF THE DRAWING

Other objects, features and advantages of the invention, its organization, construction and operation will be best understood from the following detailed description, taken in conjunction with the accompanying drawing, on which the single figure is a schematic representation of a circuit arrangement for a grey level correction for black/white quantization.

DESCRIPTION OF THE PREFERRED EMBODIMENT

Referring to the drawing, a fundamental circuit for a gray level correction for improved black/white quantization is illustrated as a block circuit diagram and is essentially composed of a first adder ADD1, a white level memory WW-RAM, and a second adder ADD2 for forming various correction values, a maximum value memory MAX, a mean value circuit DUS, a threshold circuit EPROM and a comparator COMP. The incoming, digitized gray levels GW, for example six bits, proceed via an inverter INV to the input AS of the first adder ADD1. The second input BS of the first adder ADD1 is connected to the white level memory WWRAM via a white level bus WW-BUS. The current gray signal GW is subtracted from the maximum white levels stored therein since the first adder ADD1 acts as a subtractor because of the presetting inverter INV. The subtracting adder ADD1 is followed by a multiplexer MUX that, controlled by a carry signal UEB appearing at the transfer output $C_{A1}$ of the first adder ADD1, through connects either the corrected gray levels KOGRA appearing at the output AS+BS or respective zeroes via the input Q. The latter is provided for that case wherein a negative value for the corrected gray levels KOGRA would derive due to the subtraction in the first adder ADD1. The corrected gray levels KOGRA are now fed, first of all, directly to a first input AV of the comparator COMP and, secondly, to the inputs of the maximum value memory MAX or, respectively, of the mean value circuit DUS. The output signals of the maximum value memory MAX and of the mean value circuit DUS address the threshold circuit composed of a programmable read-only memory EPROM, the threshold circuit outputting a threshold assigned to the respective address to the second input BV of the comparator COMP. A decision is made on the basis of this threshold whether the corrected gray level KOGRA supplied to the input AV of the comparator COMP is to be quantified as black level or white level.

Particularly included among the influences that may make gray level correction necessary are the scan subject, for example, a paper document indicated by the signal BI moving past the scanner having its specific reflection factors, and what is referred to as "fast aging" SA when the lamp control of the light source of the scanner tends very quickly in the direction of darker values. To this end, the most significant bit GWMSB1 of the digital gray level signal GW is supplied to a counter Z having hysteresis that supplies the signal BI at the output. Moreover, a signal SA, delayed by a timer ZG is formed by an AND gate UG of the two most significant gray level bits GWMSB1, 2. This timer ZG is provided in order to smooth fast transitions from pixel-to-pixel.

The correction signal composed of increments/decrements for the second adder ADD2 whose first input A is connected to the white level bus WW-BUS of the white level memory WW-RAM is accordingly composed of the most significant bit KOGRAMSB of the corrected gray level KOGRA, of the signals BI and SA derived from the grey level values GW, as well as the carry signal UEB of the first adder ADD1, whereby the significance of the total four bits is defined as follows:

|          | BITPLACE      |
| -------- | ------------- |
| UEB + SA | $2^3$         |
| BI       | $2^2$         |
| SA-      | $2^1 + 2^0$   |
| KOGRAMSB | $2^0$         |

The signal UEB=0 denotes that the operational sign at the input of the second adder ADD2 is positive. Given the signal SA—, the least significant bit 2° additionally proceeds to carry input of the second adder ADD2.

When, due to a decrement at the input B of the second adder ADD2 and low white levels from the white level memory W-RAM, a decremented white level less than 0 would arise at the output A±B respective "0" bits are applied onto the white level bus WW-BUS via a driver T which is controlled by the carry signal $C_{A2}$ of the second adder ADD2.

Dependent on the respective scan conditions, it is the following increment-decrement values, for example, that derive from the corresponding bit combinations formed of the signals UEB, BI, SA and KOGRAMSB:

|                           | INCR | DECR |
| ------------------------- | ---- | ---- |
| UEB-, BI, SA-, KOGRAMSB-  | + 7  |      |
| UEB-, BI, SA, KOGRAMSB-   | + 12 |      |
| UEB, BI-, SA-, KOGRAMSB-  |      | −5   |
| UEB, BI-, SA-, KOGRAMSB   |      | −4   |
| UEB, BI, SA, KOGRAMSB-    |      | −4   |
| UEB, BI, SA, KOGRAMSB     |      | −3   |
| UEB, BI, SA-, KOGRAMSB-   |      | −1   |
| UEB, BI, SA-, KOGRAMSB    |      | ZERO |

The increment +7 is selected when the gray level GW is brighter than the white level WW and the scanner scans a document. The increment +12 is selected when, additionally, the condition of the lamp control indicates that an especially high gray level GW is present.

The decrements −5 and −4 are selected in the document gap; the decrement −4, however, also appears when the scanner scans a document and the signal SA indicates that the lamp brightness is greatly dimming.

The decrement is reduced to −3 when the pixel in question probably belongs to a black print that is not to be thinned by a white level darkening. The decrement −1 is only selected when the gray value GW appearing on the document is darker than the white level WW and when the lamp control is momentarily not noticeably controlling downward.

Increment/decrement=zero, i.e. holding the white level constant, is selected when the pixel in question apparently belongs to a printed blackening that is not to be diluted by white level darkening.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A circuit arrangement for white level acquisition for the black/white quantization of the scan signals of individual photosensors having different gray levels, comprising:
   a first adder including a first input for receiving digitized output signals of the photosensors, a second input, a first output and a second output;
   a white level memory connected to said second input of said first adder;
   a second adder including a first input connected to said white level memory, a second input, a first output and a second output;
   a comparator connected to said first adder and supplying a black signal or a white signal dependent on a threshold value derived from maximum blackening values and average blackening values from said first adder; and
   said second output of said first adder connected to said second adder to cause said second adder to provide a variable correction signal derived from a plurality of influencing variables dependent on a carry signal appearing at said second output of said first adder such that said second adder provides a white level increment/decrement to said white level memory.

2. The circuit arrangement of claim 1, and further comprising a multiplexer including a first input connected to said first output of said first adder, a second input for receiving all "0" and a third input for receiving a carry signal from the second output of said first adder, said multiplexer including an output connected to said comparator.

3. The circuit arrangement of claim 1, and further comprising:
   a driver connected to said second output of said second adder and said driver including an input for receiving all "0" and an output connected to said white level memory for writing "0" bits into said white level memory in response to the carry signal of said second adder.

4. A circuit arrangement for white level acquisition for the black/white quantization of the scan signals of photosensors having different grey levels, comprising:
   a first adder including a first input for receiving digitalized output signals of the photosensors, a second input, a first output and a second output;
   a white level memory connected to said second input of said first adder;
   a second adder including a first input connected to said white level memory, a second input, a first output and a second output;
   a comparator connected to said first adder and supplying a black signal or a white signal dependent on a threshold value derived from maximum blackening values and average blackening values from said first adder;
   said second adder producing a variable correction signal derived from a plurality of influencing variables; and
   said correction signal providing a white level increment/decrement to said white level memory dependent on a carry signal appearing at said second output of said first adder.

5. The circuit arrangement of claim 4, wherein:
   said second adder is constructed to produce said correction signal from the most significant bit of a signal at said first output of said first adder and from a pulse derived from the most significant bit of the scan signal and from a control variable bit derived from the two most significant bits of the scan signal referred to a control of a scan light source.

6. The circuit arrangement of claim 4, and further comprising:
   an AND gate including first and second inputs respectively connected to receive the first and second most significant bits of the scan signal, and an output;
   a delay circuit including an input connected to said output of said AND gate, and an output connected to said second input of said second adder.

7. The circuit arrangement of claim 4, and further comprising:
   a counter including an input connected to receive the most significant bit of the scan signal, and an output connected to said second input of said second adder.

8. The circuit arrangement of claim 4, and further comprising:
   a multiplexer including a first input connected to said first output of said first adder, a second input for receiving all "0'" and a third input for receiving a carry signal from the second output of said first adder, said multiplexer including an output connected to said comparator.

9. The circuit arrangement of claim 4, and further comprising:
   a driver connected to said second output of said second adder and an input for receiving all "0'" and an output connected to said white level memory for stepping "0" bits into said white level memory in response to the carry signal of said second adder.

* * * * *